United States Patent [19]

Takajo et al.

[11] Patent Number: 5,131,005
[45] Date of Patent: Jul. 14, 1992

[54] MELTING APPARATUS HAVING DOUBLE WALL STRUCTURE

[75] Inventors: Toshi Takajo, Tokorozawa; Kazuo Tanaka, Hachioji, both of Japan

[73] Assignee: Hoya Corporation, Tokyo, Japan

[21] Appl. No.: 604,484

[22] Filed: Oct. 29, 1990

[30] Foreign Application Priority Data

Nov. 30, 1989 [JP] Japan .................. 1-312763

[51] Int. Cl.⁵ .................................. C03B 5/02
[52] U.S. Cl. ................................ 373/27; 373/29; 373/30; 373/33; 373/39; 373/119; 373/130; 373/142; 65/157; 65/335
[58] Field of Search .............. 373/27-33, 373/35, 39, 40, 114, 128, 49, 129, 130, 147, 142, 149, 150, 156, 157, 159, 160, 161-164, 166, 167, 117, 118, 119; 164/437; 65/5, 16, 136, 157, 335

[56] References Cited

U.S. PATENT DOCUMENTS

| | | | |
|---|---|---|---|
| 985,226 | 2/1911 | Taylor | 373/114 |
| 1,680,543 | 8/1928 | Howard | 373/33 |
| 2,179,224 | 11/1939 | Soubier | 373/33 |
| 2,215,982 | 9/1940 | Slayter et al. | 373/33 |
| 2,565,136 | 8/1951 | Kretzmer | 373/33 |
| 3,235,243 | 2/1966 | Taylor | 373/155 |
| 3,744,989 | 7/1973 | Doenecke et al. | 373/49 |
| 3,837,825 | 9/1974 | Loxley et al. | 65/18 |
| 4,101,305 | 7/1978 | Midwinter et al. | 65/145 |
| 4,123,243 | 10/1978 | Levecque et al. | 65/16 |
| 4,292,505 | 9/1981 | Lee | 373/128 |
| 4,438,518 | 3/1984 | Gaul et al. | 373/28 |
| 4,514,851 | 4/1985 | Dunn | 373/27 |
| 4,594,723 | 6/1986 | Folgero et al. | 373/159 |

FOREIGN PATENT DOCUMENTS 495534 11/1938 United Kingdom ............. 373/39

Primary Examiner—Bruce A. Reynolds
Assistant Examiner—Tu Hoang
Attorney, Agent, or Firm—Nixon & Vanderhye

[57] ABSTRACT

A melting apparatus in which a material to be melted is accommodated in a crucible made of platinum or its alloy, and electric current passes through the crucible to generate heat or melt the material. At least a part of the crucible is formed into a double-wall structure having inner and outer peripheral walls. The electric current is caused to pass through the double-wall structure to generate the heat.

17 Claims, 3 Drawing Sheets

MELTING APPARATUS HAVING DOUBLE WALL STRUCTURE

BACKGROUND OF THE INVENTION

The present invention relates to a melting apparatus which is particularly suitable for a case where a relatively small quantity of high-quality glass material is melted, for example.

The following methods (1) through (3) are conventionally known as a method of melting a material to be melted such as a glass material or the like, for example.

(1) A method due to indirect heating in which a crucible or a melting tank having accommodated therein a material to be melted is heated by an oil-fuel furnace, a gas furnace or an electric furnace which employs silicon-carbide resistant heating elements.

(2) A direct-energization method in which an electrode made of platinum, tin oxide, molybdenum or the like is immersed in a glass raw material, and electricity is caused to directly pass through a material to be melted, to heat-generate the latter per se.

(3) A method in which a platinum crucible having accommodated therein a material to be melted is heated by means of high-frequency induction heating.

However, the above-described conventional melting methods have the following problems, and are not suitable for melting a small quantity of high-quality glass material or the like, for example.

Problems in Method due to Indirect Heating (a) Heat of combustion of oil fuel or fuel gas or heat due to heat generation of resistant elements is not chiefly used in melting of the glass material or the like in an effective manner, and is discharged to the outside. Thus, heat efficiency is low, and there are many wastes.

(b) A combustion space about the crucible or the melting tank and/or a space in which the resistant heating elements are arranged or disposed are required. Thus, it is impossible to form the apparatus into a compact one.

(c) Because of the indirect heating, quick or rapid melting is impossible.

Problems in Method due to Direct Energization Method

It is assumed that, in this direct energization method, a pair of platinum electrodes, for example, are used and a power source of the normal frequency 50 Hz or 60 Hz is employed. In this case, the surfaces of the respective platinum electrodes are partially freed in the glass material to generate platinum inclusions, so that the quality of the glass material is deteriorated. In order to avoid generation of the platinum inclusions, it is required to use the electric power source whose frequency is on the order of 9000 Hz. Thus, equipment or installation such as a frequency transducer becomes necessary.

Problems in Method due to High-frequency Induction Heating

The high-frequency induction heating method requires equipment such as a frequency transducer or the like.

SUMMARY OF THE INVENTION

It is therefore an object of the invention to provide a melting apparatus which is relatively simple in construction, which is superior in thermal efficiency, which is easy in rapid heating, which has no fear that the quality of a material to be melted is deteriorated.

According to the invention, there is provided a melting apparatus comprising:

a crucible made of one of platinum and its alloy and having accommodated therein a material to be melted, the crucible having a peripheral wall section;

an electric power source; and conductive means having one end thereof connected to the electric power source and the other end connected to the crucible, for causing electric current from the electric power source to pass through the crucible to generate heat thereby melting the material, wherein at least a part of the peripheral wall section of the crucible is formed into a double-wall structure having an inner peripheral wall and an outer peripheral wall, and wherein the electric current is sent to the double-wall structure of the crucible through the conductive means to generate the heat.

With the arrangement of the invention, the electric current is caused to pass through the double-wall structure of the crucible to generate the heat, whereby it is possible to increase the heat generation capacity. In addition, the heat generation is effected at both the inner and outer peripheral walls of the double-wall structure, whereby the heat or thermal gradient between the inner and outer peripheral walls is considerably reduced. Accordingly, the heat generated at the inner peripheral wall is not almost discharged to the outside, but all of the heat is effectively employed in melting of the material to be melted. Furthermore, since the heat generation is practiced by direct passing of the electric current through the double-wall structure per se, waste energy is not spent at other portions of the crucible. Moreover, passing of the electric current immediately starts the heat generation, and the crucible is rapidly brought to a predetermined temperature. Thus, it is also possible to rapidly melt the material. Further, it is possible to avoid a fear that the electric current is locally concentrated to locally melt the platinum or its alloy of the crucible to deteriorate the quality of the material. In addition, the double-wall structure of the crucible increases its mechanical strength. Thus, handling of the crucible is also made easy.

As described above, the melting apparatus according to the invention is arranged such that at least the part of the crucible is formed into the double-wall structure, and the electric current is caused to pass through at least the double-wall structure to generate the heat. Accordingly, there can be provided the melting apparatus which has its relatively simple construction, which is superior in thermal efficiency, which is easy in rapid heating, and which has no fear that the quality of the material is deteriorated.

DESCRIPTION OF THE EMBODIMENTS

First Embodiment

Figure 1:
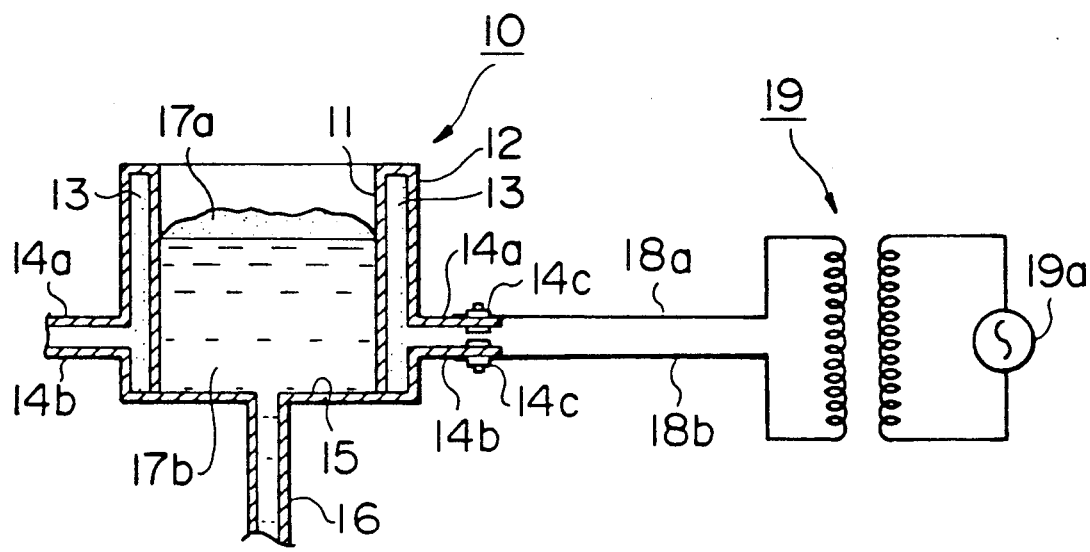
FIG. 1 is a somewhat diagrammatic cross-sectional view of a melting apparatus according to a first embodiment of the invention.
Figure 2:
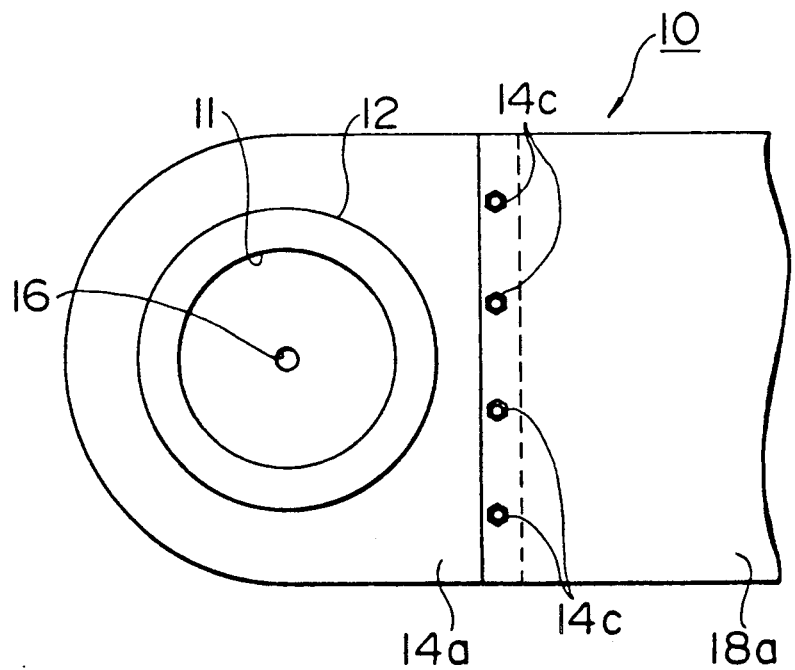
FIG. 2 is a fragmentary top plan view of the melting apparatus illustrated in FIG. 1.

Referring first to FIGS. 1 and 2, there is shown a melting apparatus according to a first embodiment of the invention. As illustrated in FIGS. 1 and 2, the melting apparatus comprises a crucible 10 which has a double-wall structure composed of an inner peripheral wall 11 and an outer peripheral wall 12. A filler 13 is filled in a space defined between the inner and outer peripheral walls 11 and 12. A pair of electricity supply flanges 14a and 14b are associated with the outer peripheral wall 12. The crucible 10 has its bottom 15 to which an outflow pipe 16 is connected. A glass raw material 17a is poured into the crucible 10, and is melted therein so that a molten glass material 17b is formed. A pair of conductive plates 18a and 18b have their respective one ends which are connected respectively to the electricity supply flanges 14a and 14b. The other ends of the respective conductive plates 18a and 18b are connected to a compound transformer 19.

The crucible 10 is in the form of a cylindrical container in plan, which has a bottom and which is made of platinum. The crucible 10 has its peripheral side wall section which is formed into the double-wall structure composed of the inner peripheral wall 11 and the outer peripheral wall 12. The inner and outer peripheral walls 11 and 12 have their respective upper ends which are connected to each other. In addition, lower ends of the respective inner and outer peripheral walls 11 and 12 are connected to each other by the bottom 15.

The outer peripheral wall 12 is cut into a pair of upper and lower wall portions. The pair of electricity supply flanges 14a and 14b extend horizontally, and are mounted respectively to cut ends of the respective upper and lower wall portions of the outer peripheral wall 12 in opposed relation to each other. Specifically, the electricity supply flange 14a is connected to the lower end of the upper wall portion of the outer peripheral wall 12, while the electricity supply flange 14b is connected to the upper end of the lower wall portion of the outer peripheral wall 12. The electricity supply flanges 14a and 14b function such that, when electric current passes between the electricity supply flanges 14a and 14b, the electric current flows uniformly through the outer and inner peripheral walls 12 and 11 over their respective entire peripheries.

An annular gap is defined between the inner and outer peripheral walls 11 and 12, and is filled with the filler 13 provided with heat resistance and insulation such as alumina powder or the like. By filling of the filler 13, the inner and outer peripheral walls 11 and 12 can effectively be prevented from being thermally deformed, and a heat gradient between the inner and outer peripheral walls 11 and 12 can be reduced. Further, the outflow pipe 16 is connected to the bottom 15 of the crucible 10, for introducing the molten glass material 17b to the outside. Although not shown, a defoaming tank, a homogeneous tank or the like may be connected to a forward end, that is, a lower end of the outflow pipe 16.

The pair of electricity supply flanges 14a and 14b are connected respectively to the pair of conductive plates 18a and 18b through respective fixing screw elements 14c and 14c. The electricity supply flanges 14a and 14b are connected to a secondary winding of the complex transformer 19 respectively through the conductive plates 18a and 18b. A primary winding of the complex transformer 19 is connected to an electric power source 19a.

With the melting apparatus constructed as described above, an electric power of low voltage and large current is supplied to a location between the electricity supply flanges 14a and 14b from the electric power source 19a through the complex transformer 19. By the electric power, it is possible to heat-generate the outer and inner peripheral walls 12 and 11. Thus, when the glass raw material 17a is poured into the crucible 10, the glass raw material 17a can be melted. The molten glass material 17b formed in this manner is taken out of the outside through the outflow pipe 16.

The above-described melting apparatus according to the first embodiment has the following advantages.

That is, since heat generation is effected by the inner and outer peripheral walls 11 and 12, a heat generation ability or capacity is large. Further, since heat generator is practiced at both the inner and outer peripheral walls 11 and 12, the thermal gradient therebetween is considerably reduced. Accordingly, the heat generated at the inner peripheral wall 11 is not almost discharged to the outside, but all of the heat is effectively used in melting of the glass material. Furthermore, since the heat generation is effected by passage of the electric current through the inner and outer peripheral walls 11 and 12 per se, energy is not wastefully spent at other portions of the crucible 10. Moreover, when the electric current passes through the inner and outer peripheral walls 11 and 12, heat generation starts immediately, so that the crucible 10 is rapidly brought to its predetermined temperature. Thus, quick melting is also possible. Further, by the action of the electricity supply flanges 14a and 14b, there is no fear that the electric current is locally concentrated to locally melt the platinum or its alloy of the crucible 10, so that the quality of the glass material is deteriorated. Furthermore, since the peripheral wall section of the crucible 10 is formed into the double-wall structure, the mechanical strength of the crucible 10 increases. Thus, handling of the crucible 10 is also easy.

The inventors of this application have actually manufactured the glass melting apparatus according to the first embodiment of the invention, and have conducted melting experiments. An example of the experimental results will be indicated below.

Dimension of Crucible 10

Material: Platinum or its Alloy
Thickness: 0.5 mm
Height: 240 mm
Inner diameter of the inner peripheral wall 11: 130 mm
Outer diameter of the outer peripheral wall 12: 145 mm
Capacity of the cruicible 10: 2.4 letters
Weight of the glass material: 9.3 Kg
Liquid level: 60 mm from the upper end of the crucible
Diameter of the supply flanges 14a and 14b:185 mm
Thickness of the supply flanges 14a and 14b:1.8 mm
  (In connection with the above, there are caused no problems if respective connecting portions between the electricity supply flanges 14a and 14b and the conductive plates 18a and 18b, which are not brought to high temperature, are mades of vanadium which is lower in cost than platinum)
Filler 13: Alumina powder Thickness of the filler 13: 14 mm
(In connection the above, the thickness of the filler 13 was preferable if the thickness is small as far as possible unless a short circuit is not caused)

Type of Glass Material to be molded

Lanthanide-series glass

Supplying Electric Power 6 kw/Hr (3 V, 2000 A)

Glass Raw Material

Powdered glass raw material

Melting Temperature

1330° C.
(Temperature of the inner peripheral wall 11: 1330° C. Temperature of the outer peripheral wall 12: 1400° C.)

Raw Material Input 800 g/15 minutes

Second Embodiment

Figure 3:
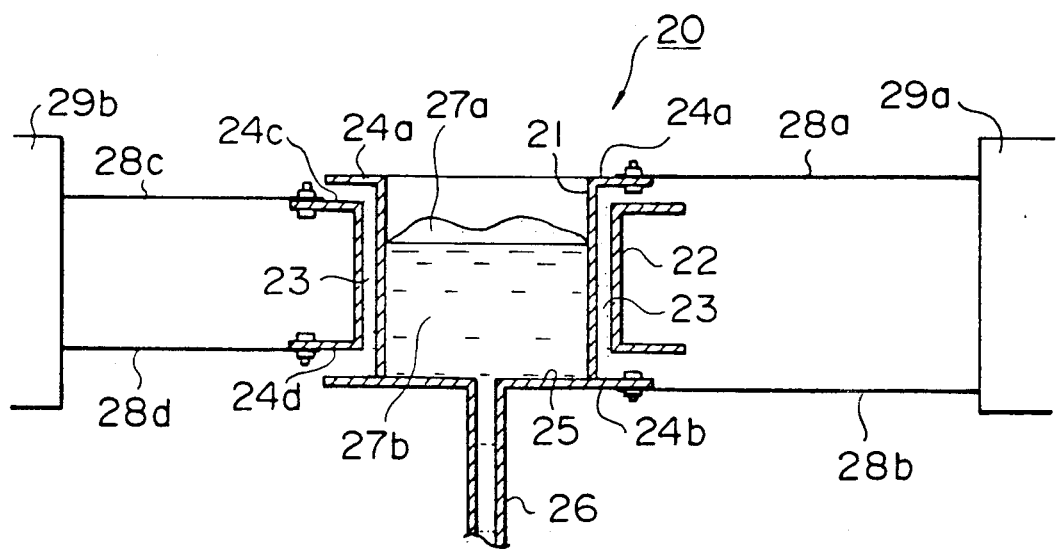
FIG. 3 is a somewhat diagrammatic cross-sectional view of a melting apparatus according to a second embodiment of the invention.
Figure 4:
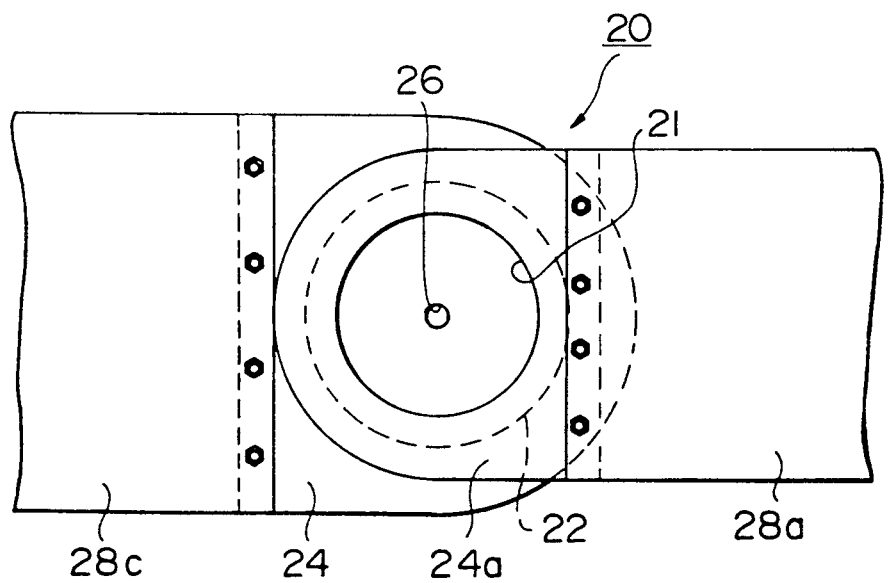
FIG. 4 is a fragmentary top plan view of the melting apparatus illustrated in FIG. 3.

Referring next to FIGS. 3 and 4, there is shown a melting apparatus according to a second embodiment of the invention. FIG. 3 is a cross-sectional view of the melting apparatus, while FIG. 4 is a fragmentary top plan view of the melting apparatus. The melting apparatus according to the second embodiment will be described below with reference to FIGS. 3 and 4.

The melting apparatus according to the second embodiment is arranged such that the inner and outer peripheral walls 11 and 12 of the crucible 10 in the aforesaid first embodiment are separated from each other, and an electric power is supplied to these inner and outer peripheral walls 11 and 12 independently of each other.

Specifically, as shown in FIGS. 3 and 4, an inner wall 21 is supplied with an electric power from a complex transformer 29a through a pair of conductive plates 28a and 28b. Further, an outer pripheral wall 22 is supplied with the electric power from a complex transformer 29b through a pair of conductive plates 28c and 28d.

That is, a crucible 20 has the above-described inner and outer peripheral walls 21 and 22. A filler 23 is filled in a space difined between the inner and outer peripheral walls 21 and 22. A pair of electricity supply flanges 24a and 24b are provided respectively at upper and lower ends of the inner peripheral wall 21, while a pair of electricity supply flanges 24c and 24d are provided respectively at upper and lower ends of the outer peripheral wall 22. The crucible 20 has its bottom 25, and an outflow pipe 26 is connected to the bottom 25. A glass raw material 27a is fed or supplied to the crucible 20, and is melted therein so that a molten glass material 27b is formed. These parts and elements are the same as those illustrated in FIGS. 1 and 2, and the detailed description of these parts and elements will be omitted.

According to the second embodiment, there are produced functions advantages similar to those obtained by the aforementioned first embodiment. In addition, the electric power is supplied to the inner and outer peripheral walls 21 and 22 independently of each other. Accordingly, by setting supply quantities of electric power to the respective inner and outer pripheral walls 21 and 22 independently of each other, the heat or thermal quantities of the respective inner and outer peripheral walls 21 and 22 can freely be set, making it possible to easily melt the glass raw material 27a under optimum conditions.

Further, since, normally, the inner peripheral wall 21 is quickly or rapidly deteriorated, it is possible to replace only the inner peripheral wall 21 by new one independently, making it possible to save the maintenance cost.

Third Embodiment

Figure 5:
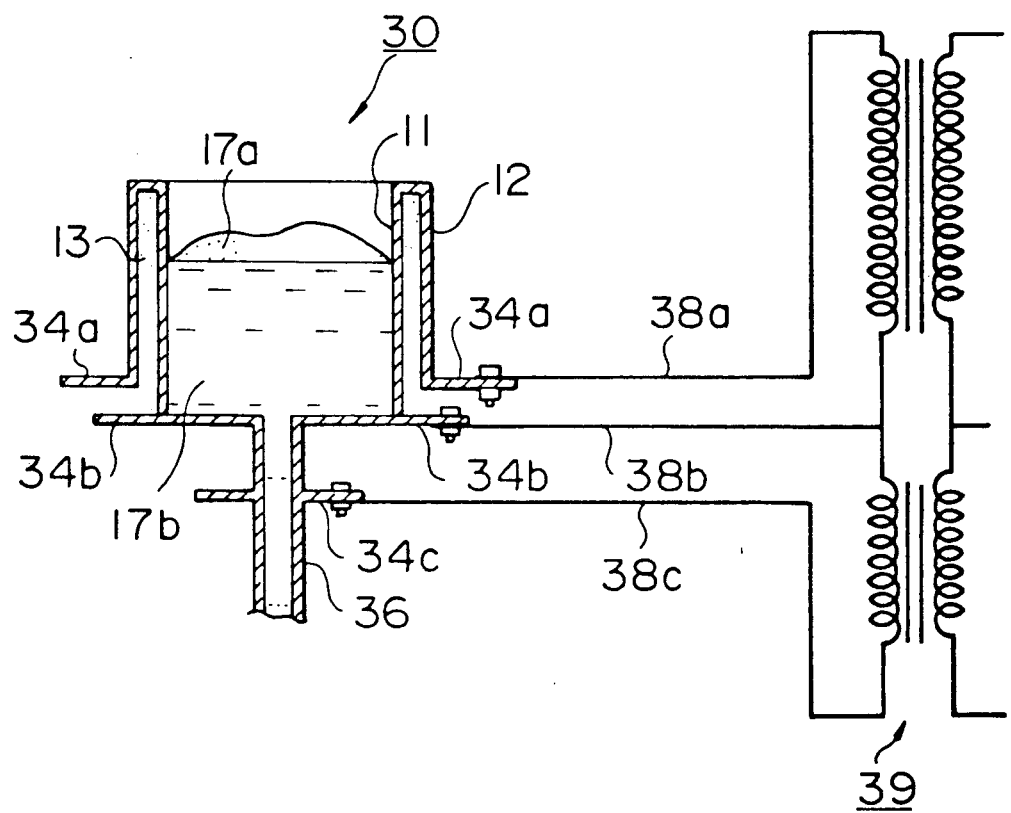
FIG. 5 is a somewhat diagrammatic cross-sectional view of a melting apparatus according to a third embodiment of the invention.

Referring tnext to FIG. 5, there is shown a melting apparatus according to a third embodiment of the invention.

As shown in FIG. 5, the melting apparatus according to the third embodiment is arranged such that an electricity supply flange 34c is provided on an outflow pipe 36 corresponding to the outflow pipe 16 in the foresaid first embodiment, the pair of electricity supply flanges 14a and 14b in the first embodiment are deviated downwardly in their respective positions to form a pair of electricity supply flanges 34a and 34b, and three-phase electric current is supplied from a complex transformer 39 to the electricity supply flanges 34a and 34b respectively through conductive plates 38a, 38b and 38c. Other arrangement of the third embodiment is identical with that of the first embodiment. Thus, parts and components similar to those of the first embodiment are designed by the like or similar reference numerals, and the description of the like or similar components and parts will therefore be omitted. In this connection, the reference numeral 30 in FIG. 5 denotes a crucible.

According to the third embodiment, there are produced functional advantages similar to those obtained by the aforementioned first embodiment. In addition, there are produced the following advantages. That is, since the bottom of the crucible 30 and a part of the outflow pipe 36 are heated, the melting capacity of the melting apparatus is improved, and it is made easy to take out the molten glass material to the outside.

What is claimed is:

1. A melting apparatus comprising:
    a crucible receiving therein a material to be melted, said crucible having a peripheral wall section made of platinum or a platinum alloy
    an electric power source;
    conductive means having one end thereof connected to said electric power source and the other end connected to said crucible, for causing electric current from said electric power source to pass through said crucible to generate heat thereby melting said material;
    at least part of said peripheral wall section of said crucible comprising a double-wall structure having an inner peripheral wall and an outer peripheral wall;
    a filling material filled between said inner and outer peripheral walls, said filling material having heat resistance and electric insulation properties; and
    wherein said inner and outer preipheral walls of said double-wall structure serve respectively as resistance heating elements, and said electric current is sent to said inner and outer peripheral walls through said conductive means to generate said heat 2. The melting apparatus according to claim 1, wherein said crucible is a cylindrical container having a bottom.

3. The melting apparatus according to claim 1, wherein said inner peripheral wall has an upper and lower ends, and said outer peripheral wall has an upper and lower ends, and wherein said upper and lower ends of said inner peripheral wall are connected respectively to said upper and lower ends of said outer peripheral wall.

4. The melting apparatus according to claim 3, wherein said outer peripheral wall of said crucible is cut into a pair of upper and lower wall portions, and wherein said melting apparatus further comprises a pair of electricity supply flanges which are provided respectively at a lower end of said upper wall portion and an upper end of said lower wall portion, the other end of said conductive means being connected to said electrically supply flanges.

5. The melting apparatus according to claim 4, wherein said conductive means has a pair of conductive plates connected respectively to said pair of electricity supply flanges.

6. The melting apparatus according to claim 5, wherein said conductive means further has a transformer having a primary winding and a secondary winding, said primary winding being connected to said electric power source, and said secondary winding being connected to said pair of conductive plates.

7. The melting apparatus according to claim 4, wherein said pair of electricity supply force flanges are arranged in opposed relation to each other.

8. A melting apparatus comprising:
a crucible receiving therein a material to be melted, said crucible having a peripheral wall section made of platinum on a platinum alloy;
an electric power source;
conductive means having one end thereof connected to said electric power source and the other end connected to said crucible, for causing electric current from said electric power source to pass through said crucible to generate heat thereby melting said material;
at least a part of said peripheral wall section of said crucible comprising a double-wall structure having an inner peripheral wall and an outer peripheral wall;
a pair of electricity supply flanges extending radially outwardly respectively from said inner and outer peripheral walls of said double-wall structure, said other end of said conductive means being connected to said part of electricity supply flanges;
a filling material filled between said inner and outer peripheral walls, said filling material having heat resistance and electric insulation properties; and
wherein said inner and outer peripheral walls of said double-wall structure serve respectively as resistance heating elements, and said electric current is sent to said inner and outer peripheral walls through said conductive means and said pair of electricity supply flanges to generate said heat.

9. The melting apparatus according to claim 1, wherein said filler is alumina powder.

10. The melting apparatus according to claim 1, further comprising an outflow pipe connected to a bottom of said crucible, for introducing a molten glass material from said crucible to the outside.

11. The melting apparatus according to claim 1, wherein said inner and outer peripheral walls of said crucible are separated from each other, and wherein said conductive means includes first and second conductive elements connected respectively to said inner and outer peripheral walls of said crucible, to supply said electric current from said electric power source to said inner and outer peripheral walls independently of each other.

12. The melting apparatus according to claim 11, further comprising first and second pairs of electricity supply flanges, said first pair of electricity supply flanges being connected respectively to upper and lower ends of said inner peripheral wall of said crucible, and said second pair of electricity supply flanges being connected respectively to upper and lower ends of said outer peripheral wall of said crucible.

13. The melting apparatus according to claim 10, further comprising an electricity supply flange provided on said outflow pipe, wherein said conductive means includes a transformer, said electricity supply flange being connected to said transformer.

14. The melting apparatus according to claim 13, further comprising a pair of electricity supply flanges connected respectively to lower ends of said inner and outer peripheral walls of said crucible, wherein said pair of electricity supply flanges are connected to said transformer.

15. A melting apparatus according to Claim 1 wherein said conductive means has a pair of conductive plates connected respectively to said pair of electricity supply flanges.

16. A melting apparatus according to Claim 1 wherein said conductive means further has a transformer having a primary winding and a secondary winding, said primary winding being connected to said electric power source, and said secondary winding being connected to said pair of conductive plates.

17. A melting apparatus according to Claim 2 further comprising an outflow pipe connected to a bottom of said crucible for introducing a molten glass material from said crucible to the outside.

* * * * *